US005237644A

United States Patent [19]

Shinohara

[11] Patent Number: 5,237,644

[45] Date of Patent: Aug. 17, 1993

[54] ELECTRONIC APPARATUS FOR DETECTING RECORDING MEDIUM

[75] Inventor: Hayato Shinohara, Yokohama, Japan

[73] Assignee: Canon Kabushiki Kaisha, Tokyo, Japan

[21] Appl. No.: 634,823

[22] Filed: Jan. 2, 1991

Related U.S. Application Data

[63] Continuation of Ser. No. 414,742, Sep. 27, 1989, abandoned, which is a continuation of Ser. No. 78,646, Jul. 28, 1987, abandoned.

[30] Foreign Application Priority Data

Aug. 25, 1986 [JP] Japan ............................ 61-197197

[51] Int. Cl.[5] ........................ G06K 15/10; B41J 3/12

[52] U.S. Cl. .................................. 395/111; 395/101; 400/83; 400/708.1

[58] Field of Search ............................ 364/518, 519; 400/705.5, 708, 708.1, 83; 355/208, 309; 369/47, 53, 54; 395/111, 101

[56] References Cited

U.S. PATENT DOCUMENTS

| | | | |
|---|---|---|---|
| 1,841,588 | 1/1932 | Davis | 400/708.1 |
| 4,111,565 | 9/1978 | Jagger | 400/708 |
| 4,239,404 | 12/1980 | DeFilipps et al. | 400/613 |
| 4,393,455 | 7/1983 | Douglas et al. | 364/519 |
| 4,420,247 | 12/1983 | Suzuki et al. | 355/146 |
| 4,553,860 | 11/1985 | Imaizumi et al. | 400/68 |
| 4,644,372 | 2/1987 | Hirota | 346/138 |
| 4,655,626 | 4/1987 | Okazaki | 400/605 |
| 4,690,577 | 9/1987 | Kikuchi et al. | 400/708 |
| 4,707,159 | 11/1987 | Hirano et al. | 400/639.1 |
| 4,727,437 | 2/1988 | Mizoguchi | 358/304 |

FOREIGN PATENT DOCUMENTS

| | | | |
|---|---|---|---|
| 55-3275 | 1/1980 | Japan . | |
| 57-201657 | 12/1982 | Japan . | |
| 0057374 | 3/1986 | Japan | 400/708.1 |
| 0167587 | 7/1986 | Japan | 400/708.1 |
| 0137180 | 8/1986 | Japan | 400/708.1 |

*Primary Examiner*—Phu K. Nguyen
*Attorney, Agent, or Firm*—Fitzpatrick, Cella, Harper & Scinto

[57] ABSTRACT

A photocoupler consisting of a light emitting unit and a photo sensing unit is arranged at a predetermined position of a recording medium feeding path to thereby detect the presence or absence of the recording medium. The light emitting unit is driven by a drive signal having a predetermined signal format. A photo signal of the light emitting unit corresponding to the drive signal is detected by the photo sensing unit, thereby detecting the presence or absence of the recording medium. The recording medium is fed to a predetermined recording position on the basis of the detection of the recording medium.

22 Claims, 5 Drawing Sheets

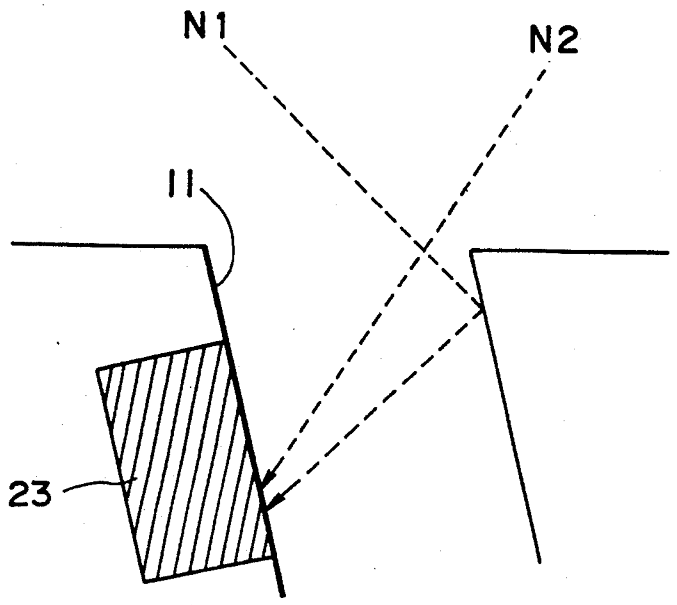
FIG. 10
FIG. 11A
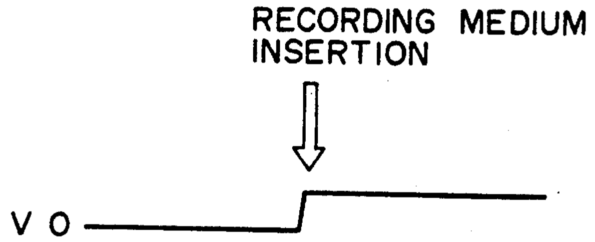
FIG. 11B
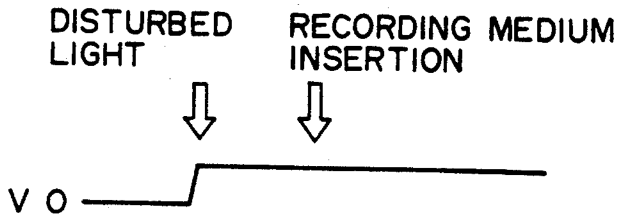

ELECTRONIC APPARATUS FOR DETECTING RECORDING MEDIUM

This application is a continuation of application Ser. No. 07/414,742 filed Sep. 27, 1989, now abandoned; which is a continuation of application Ser. No. 07/078,646 filed Jul. 28, 1987, now abandoned.

BACKGROUND OF THE INVENTION

1. Field of the Invention

The present invention relates to an electronic apparatus and, more particularly, to an electronic apparatus which has a recording device and detects the presence or absence of a recording medium at a predetermined position of a recording medium feeding path of the recording device.

2. Related Background Art

Nowadays, since recording devices are fairly miniaturized and the costs are reduced, they are equipped in various electronic apparatuses. For example, a recording mechanism is provided in an electronic desk computer, portable word processor, personal computer, electronic learning machine, electronic typewriter, etc.

The recording unit of such a kind of apparatuses or the recording mechanism of a sole recording device has a mechanism to detect the presence or absence of a recording medium such as a paper or the like at a predetermined position on a recording medium feeding path. The reason why such a detecting mechanism is provided is to control the recording position malfunction of character, image, or the like or to prevent the recording mechanism by performing the recording in the state in which no recording medium exists.

Hitherto, as a recording medium detecting mechanism in such a kind of apparatuses, a microswitch, a photosensor of the transmission type, reflection type, or the like is used.

Since the mechanical detecting means such as a microswitch or the like is operated by a recording medium which is fed, it creates an unnecessary external force that is is applied to the recording medium which is being fed. This results in a cause of the zigzag motion or jam of the recording medium.

On the other hand, since the optical detecting means such as a photosensor or the like detects in a contactless manner, such an external force is not applied to the recording medium and the feeding operation of the recording medium is not obstructed. However, there is a problem such that a malfunction occurs by the disturbed light. Hitherto, the optical detecting means is constituted in a manner such that the irradiation of the disturbed light onto the photo sensing unit of the photosensor is prevented by sealing the circumference of the photosensor or the like. However, even if the sealing property was improved, since a path to insert a recording paper from the outside of the apparatus or a path to eject the recording paper to the outside exists, it is difficult to completely eliminate the influence by the disturbed light.

The foregoing problems will now be described in detail hereinbelow by showing an example of a conventional structure.

FIG. 5 is a perspective view showing an external view of a conventional electronic apparatus. This apparatus is an electronic desk computer having an ink jet printer as a recording output device. In the diagram, reference numeral 10 denotes a main unit of the apparatus. A keyboard 14 as an input device is provided on the upper surface of the lower portion on this side of the apparatus. A printer P is provided in the rear thick portion. A display 13 consisting of a liquid crystal display, LED display, or the like is provided in the stairway portion between the printer P and the keyboard 14.

The printer P has a recording medium insertion port 11 and a recording medium ejection port 12. A recording medium such as a paper or the like is inserted from the insertion port 11. After data was recorded onto the recording medium, the recording medium is ejected from the ejection port 12 to the outside of the apparatus.

FIG. 6 shows an internal structure of the printer P of FIG. 5.

As shown in the diagram, the printer P has therein a paper feeding roller 25. A recording medium 21 inserted from the insertion port 11 passes through a paper feeding path 24 and is fed between the paper feeding roller 25 and a pinch roller 26.

The recording medium 21 is fed by the rollers 25 and 26. Data is recorded onto the recording medium 21 by a recording head 27 of the ink jet system at a predetermined position on the rectilinear feeding path near the ejection port 12. Thereafter, the recording medium is ejected from the ejection port 12.

The recording medium is detected by a photocoupler 23 at a position near the insertion port 11.

FIG. 7 shows a structure of the photocoupler 23. The photocoupler 23 has a light emitting window 31 and a photo sensing window 32.

FIG. 8 is a diagrammatical view showing the structure of the photocoupler 23 when it was seen through from the back side. A light emitting unit 33 consisting of an LED and a photo sensing unit 34 consisting of a phototransistor are provided behind the light emitting window 31 and photo sensing window 32, respectively.

The foregoing photosensor is of the reflection type. The recording medium is irradiated by the light emitting unit 33 through the light emitting window 31. The reflected light from the recording medium 21 is detected by the photo sensing unit 34 through the photo sensing window 32, thereby discriminating the presence or absence of the recording medium.

FIG. 9 shows a circuit diagram to drive and control the light emitting unit 33 and photo sensing unit 34. As shown in the diagram, a power source voltage $V_{cc}$ is applied through a resistor $R_1$ to the light emitting unit 33, so that the light emitting unit 33 is lit on. The light emitting unit 33 is always lit on by the power source voltage $V_{cc}$ or is continuously lit on for only the period of time when it is necessary to detect the recording medium.

The emitter of the photo sensing unit 34 consisting of the photo transistor is grounded through a resistor $R_2$ and the power source voltage $V_{cc}$ is applied to the collector. A medium detection signal $V_0$ by the photo sensing unit 34 is taken out as a change in emitter potential of the photo transistor.

FIG. 11A shows a potential change of the medium detection signal $V_0$ when the recording medium inserted into the insertion port 11 was normally detected. When the recording medium is inserted into the insertion port 11, the light emitted from the light emitting unit 33 is reflected by the recording medium and the reflected light is received by the photo sensing unit 34. Thus, the amount of conduction of the photo-transistor of the light emitting unit 33 increases and the potential of the detection signal $V_0$ also increases. Namely, the insertion of the medium is detected by the high-level medium detection signal $V_0$.

However, since the photocoupler 23 is disposed near the insertion port 11 of the recording medium as shown in FIG. 10, the light is irradiated onto the photo sensing unit 34 from the light emitting unit 33. The photo sensing unit 34 receives not only the signal light reflected by the recording medium but also the disturbed light which are transferred via paths such as indicated at $N_1$ and $N_2$.

The detection signal $V_0$ of the recording medium which is output from the circuit of FIG. 9 is influenced by the disturbed lights In spite of the fact that the recording medium has been inserted into the insertion port 11, a detection signal indicative of the absence of the recording medium is formed. Or, on the contrary, when no recording medium is inserted, a detection signal representative of the presence of the recording medium is formed. Thus, the recording operation is disturbed. FIG. 11B shows a state in which the disturbed lights had been irradiated at a timing earlier than the timing of the insertion of the recording medium, so that a high-level detection signal indicative of the presence of the recording medium was formed in spite of the fact that the medium is not inserted yet.

SUMMARY OF THE INVENTION

It is the first object of the invention that a light emitting signal which had been emitted from a light emitting unit and passed through a recording medium or was reflected by the recording medium and which indicates the presence or absence of the recording medium is detected by a photo sensing unit, and it is discriminated whether the photo sensing signal has a signal format corresponding to a drive signal of the light emitting unit or not, and thereby eliminating the influence by the disturbed lights.

The second object of the invention is that by eliminating the influence from the disturbed light, the recording medium is accurately detected and an erroneous feeding of the recording medium is prevented, thereby improving the reliability of the apparatus.

BRIEF DESCRIPTION OF THE DRAWINGS

FIGS. 5 to 11B are diagrams showing a constitution and the operation of a conventional electronic apparatus;

FIG. 5 is an external perspective view of a conventional electronic desk computer;

FIG. 6 is a cross sectional view of a printer in FIG. 5;

FIGS. 7 and 8 are explanatory diagrams showing a structure of a photocoupler in FIG. 6, respectively;

FIG. 9 is a circuit diagram showing a control circuit of a conventional photocoupler;

FIG. 10 is a cross sectional view showing a construction around a recording medium insertion port in FIG. 6; and FIGS. 11A and 11B are timing charts showing a drawback of a conventional recording medium detecting operation.

DETAILED DESCRIPTION OF THE INVENTION

An embodiment of the present invention will be described in detail hereinbelow with reference to the drawings.

Figure 5:
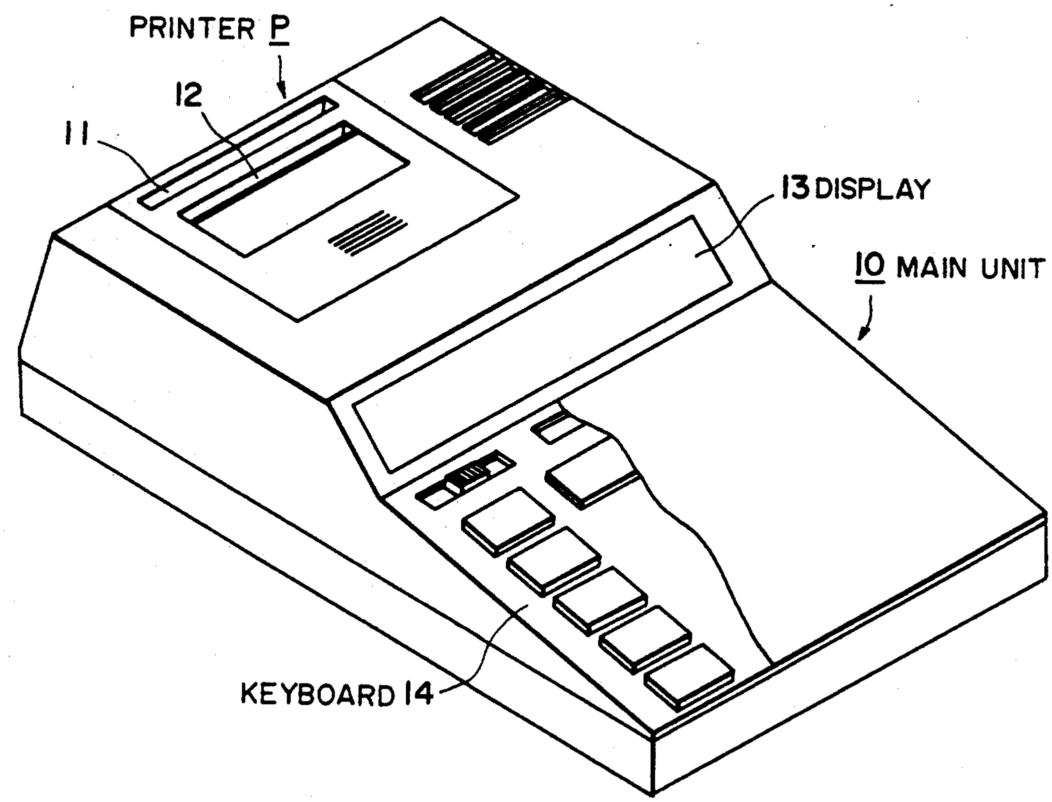
Figure 7:
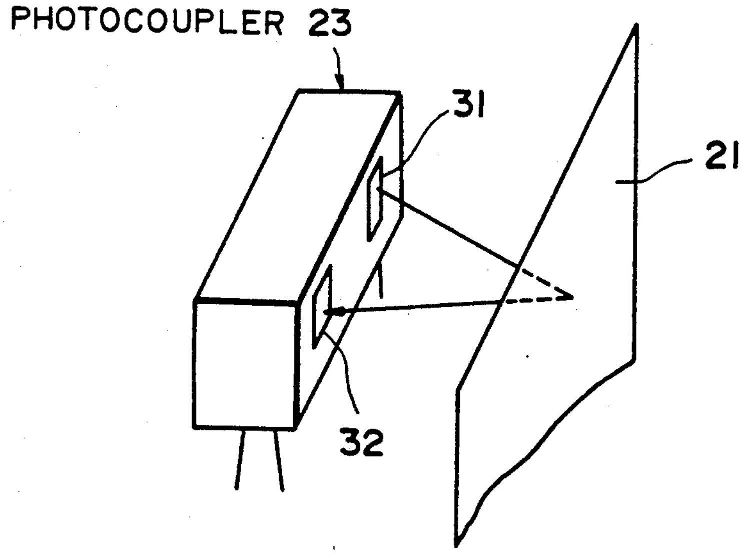
Figure 8:
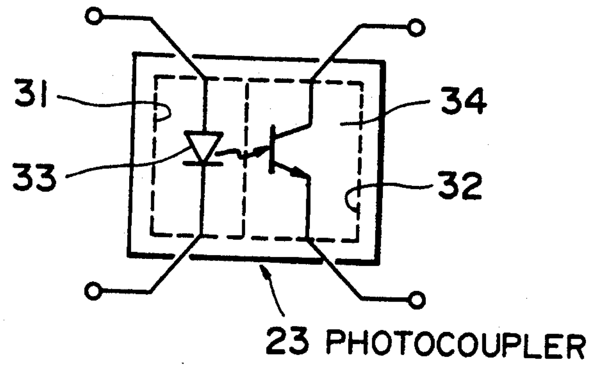

An explanation will be made with respect to an embodiment of an electronic desk computer having a printer which is similar to the computer shown in FIG. 5. It is assumed that printer and the photocoupler 23 of the printer are constituted in a manner similar to those shown in FIGS. 6 to 8.

Figure 1:
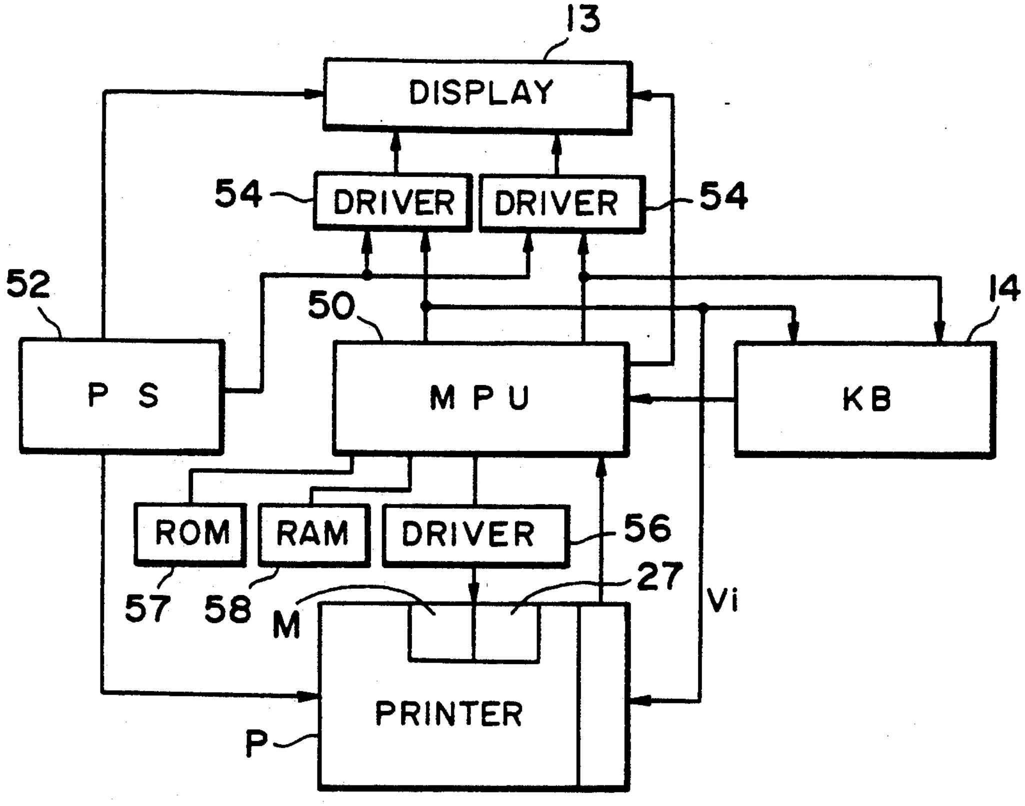
FIG. 1 is a block diagram showing a structure of a control system of an electronic apparatus to which the present invention is applied.

FIG. 1 is a block diagram showing a structure of a control system of an electronic apparatus to which the invention is applied. In the diagram, reference numeral 50 denotes an MPU to control the operation of the whole apparatus. The MPU 50 consists of a microcomputer or the like and controls the operation of the apparatus in accordance with a control program stored in ROM 57.

The keyboard 14 is constituted by a key matrix circuit or the like. The data input from the keyboard 14 is input to the MPU 50. The MPU 50 performs a predetermined arithmetic operating process in accordance with the input data. In the execution of the operating process, the memory area in RAM 58 and the register area in the MPU 50 are used as work areas.

The result of the operation is output by the display 13 or printer P. The output operations by the display 13 and printer P are controlled through drivers 54 and 56 each consisting of a driver element or the like according to each embodiment of the apparatus.

A power source is supplied to each section of the apparatus from a power source unit 52 consisting of a battery or the like.

The printer P has the photocoupler 23 as mentioned above. The medium detection signal $V_0$ which is output from the photocoupler 23 is input to the MPU 50. The control circuit of the photocoupler 23 is constituted as shown in FIG. 2.

Figure 2:
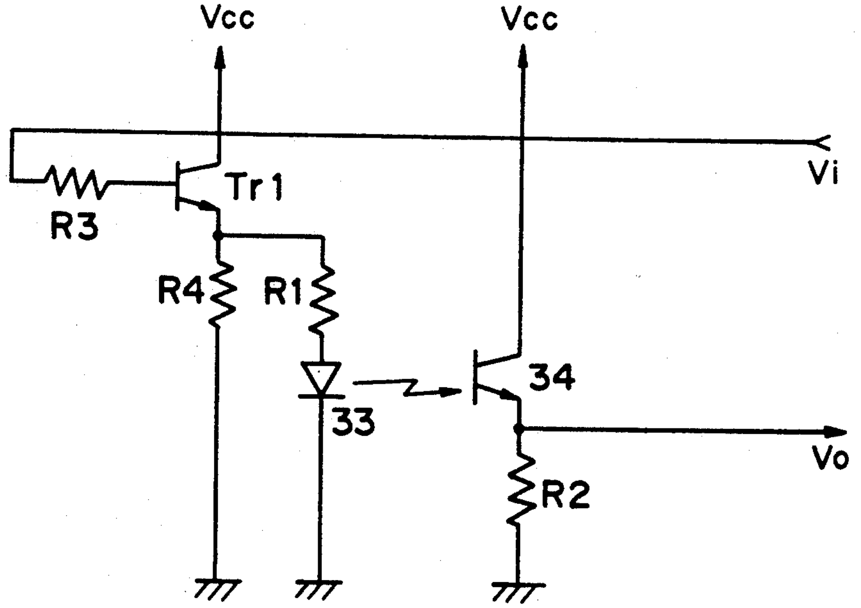
FIG. 2 is a circuit diagram showing a constitution of a control circuit of photocoupler in FIG. 1.
Figure 9:
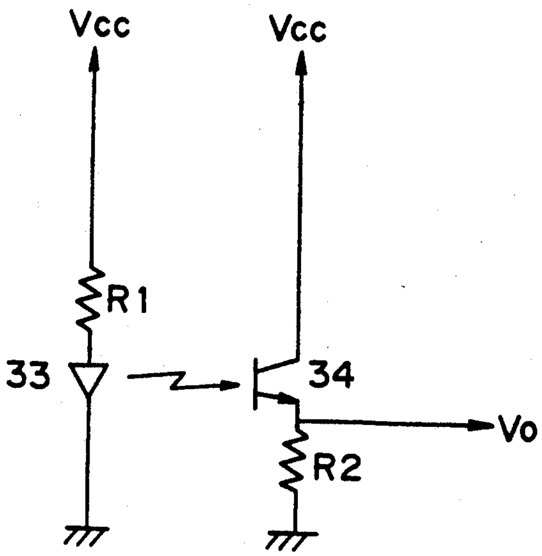

In FIG. 2, the constitution of the peripheral circuits of the photo sensing unit 34 is the same as shown in FIG. 9. On the the hand, the light emitting unit 33 is controlled by a driving circuit consisting of a transistor $Tr_1$ and resistors $R_3$ and $R_4$. A current limiting resistor $R_1$ of the light emitting unit 33 is connected to the emitter of the transistor $Tr_1$ which is grounded through the resistor $R_4$. The collector of the transistor $Tr_1$ is connected to the power source voltage $V_{cc}$.

A light emission control signal $V_i$ is input to the base of the transistor $Tr_1$ through the resistor $R_3$.

Figure 3A:
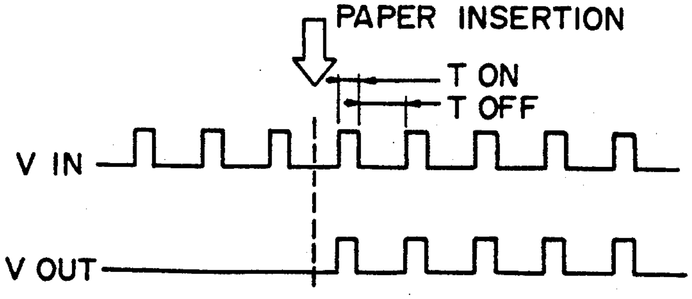
FIGS. 3A and 3B are timing charts showing the detecting operation of a recording medium according to the invention, respectively.

It is assumed that the light emission control signal $V_i$ has a signal format (pulse signal) as shown in the upper stage in FIG. 3A. The control signal $V_i$ shown in the diagram is a pulse signal of a rectangular wave having an on-timing $T_{on}$ of a predetermined duration and an off-timing $T_{off}$ of a predetermined duration.

When the light emitting unit 33 is driven by such a light emission control signal and a recording medium is inserted at predetermined timing, the medium detection signal $V_0$ which is output from the photo sensing unit 34 is as shown in the lower stage in FIG. 3A.

Since the light is not received by the photo sensing unit when the recording medium is not inserted, the detection signal $V_0$ is set to the low level. However, when the recording medium is inserted, the light emitted from the light emitting unit which is lit on and off at the timings corresponding to the light emission control signal $V_i$ is reflected by the recording medium and input to the photo sensing unit 34. Therefore, the detection signal having $V_0$ becomes the pulses having substantially the same on/off timings as those of the light emission control signal.

The operation when the disturbed light does not exist has been described above. However, when the disturbed light was input, the detection signal $V_0$ changes as shown in the lower stage in FIG. 3B. Namely, the disturbed light does not have an on/off pattern such as in the light emitting unit 33 but has almost a constant light amount. Therefore, the medium detection signal $V_0$ is set to the high level from the time point when the disturbed light was input.

Therefore, the MPU 50 checks the waveform of the medium the detection signal $V_0$ from the photocoupler 23. When the detection signal $V_0$ does not have the waveform corresponding to the light emission control signal $V_i$, it is determined that the presence of the recording medium has been erroneously detected. Thus, the MPU 50 can inhibit the operation control based on the recording medium detection, for example, the recording medium feeding operation or the like.

Although the control signal $V_i$ can be produced from a dedicated clock generator or the like, various kinds of clocks which have previously been used in the apparatus can be also used.

In the embodiment of FIG. 1, a key scan signal to scan the key matrix of the keyboard 14 has been used as a light emission control signal. A key scan signal generated from the clock generator provided in the MPU 50 is input to the keyboard 14 and is also input as a light emission control signal $V_i$ to the photocoupler 23.

A display signal of the display or the like can be also used as a light emission control signal.

With the foregoing construction, the apparatus can be simply cheaply realized as compared with the case of additionally providing a dedicated generator.

Figure 4:
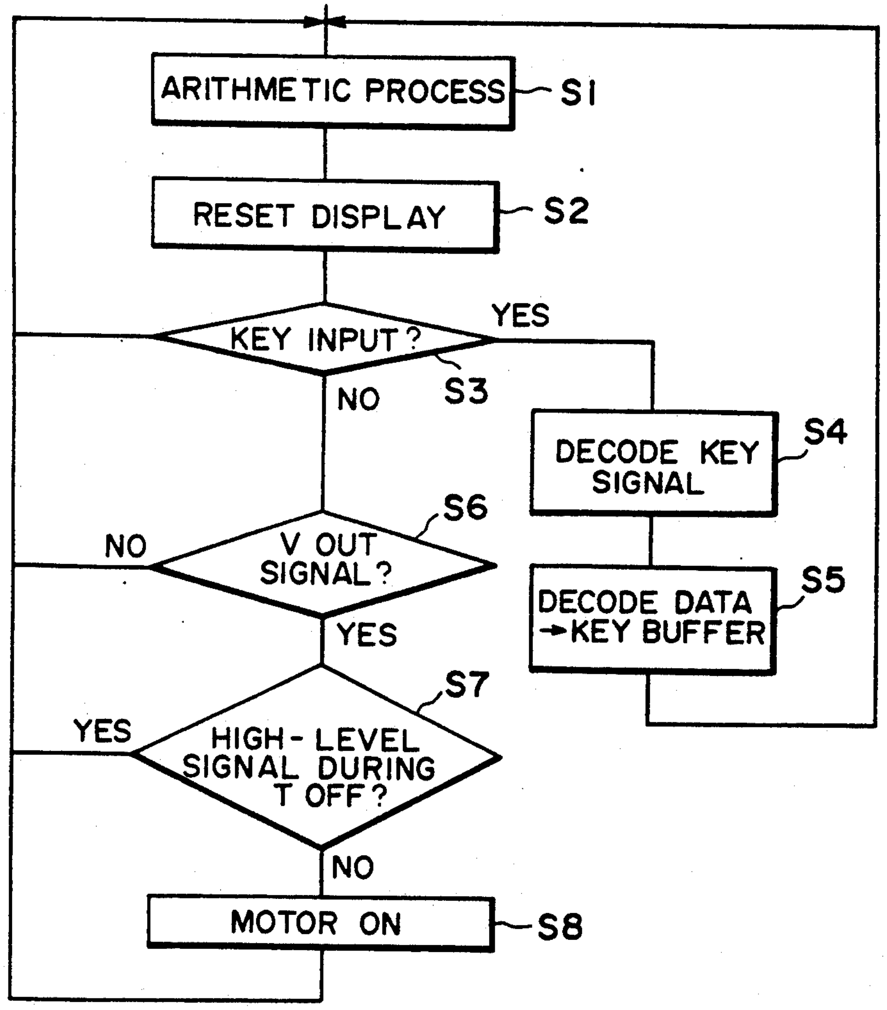
FIG. 4 is a flowchart showing a control program of an MPU in FIG. 1.

FIG. 4 shows a part of the control program of the MPU 50 when the recording medium is fed and controlled by use of the foregoing photocoupler 23. In the control of FIG. 4, a key scan signal is also used as the light emission control signal $V_i$ of the photocoupler 23. The control procedure of FIG. 4 is stored in the ROM 57 as a control program of the MPU 50.

Step S1 in FIG. 4 shows various kinds of arithmetic operating processes such as operations of four fundamental rules of arithmetics or the like which are executed in accordance with the input data from the keyboard 14. In step S2, a display digit control signal for the display 13 is reset, thereby enabling a numeral or character data which is input next to be displayed in the first digit.

In steps S3 to S5, the key input processes are executed. Namely, in step S3, a check is first made to see if a key input has been performed or not. If YES, step S4 follows and a key scan output signal is decoded. In the next step S5, the decoded input data is transferred to a keyboard buffer in the RAM 58. In the ordinary process in step S1, various kinds of arithmetic operating processes are executed in accordance with the data in the keyboard buffer. If no data is input, no process is performed in step S1 and the processing routine advances to step S3.

By executing the foregoing processes, the key scan signal is input as the light emission control signal $V_i$ to the photocoupler 23.

Figure 3B:
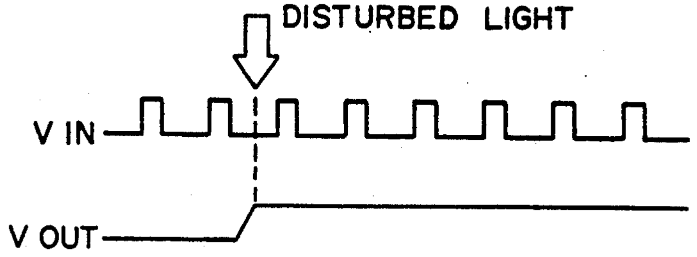

If NO in step S3, a check is made in steps S6 and S7 to see if the medium detection signal $V_0$ has been set to the high or low level, thereby discriminating whether the recording medium has been inserted or not. First, in step S6, a check is made to see if the detection signal $V_0$ has been set to the high level or not. In the next step S7, the timing of the light emission control signal $V_i$ using the key scan signal is compared with the timing of the detection signal $V_0$, thereby discriminating whether or not the high-level control signal $V_i$ has been detected for the off-timing period $T_{off}$. If YES, this means that the disturbed light was detected as shown in FIG. 3B. Therefore, the processing routine is returned to step S1.

If NO in step S7, this means that the recording medium has been inserted into the recording medium insertion port. Therefore, the paper feeding motor M to rotate the paper feeding roller 25 of the printer P is driven in step S8 and the inserted recording medium is fed to a predetermined position at which the recording can be performed by the recording head 27.

In this manner, the erroneous feeding of the recording medium which is performed by the misdetection due to the disturbed light can be certainly prevented.

The foregoing constitution is not limited to the electronic desk computer with a printer but can be also applied to various kinds of electronic apparatuses having the recording output mechanism or to recording devices.

As will be obviously understood from the above explanation, according to the invention, in an electronic apparatus having recording means and means for detecting the presence or absence of a recording medium at a predetermined position in a recording medium feeding path of the recording means, an optical detecting device (photocoupler) consisting of a light emitting unit and a photo sensing unit is provided as the detecting means, the light emitting unit is driven by a drive signal having a predetermined signal format, and a photosignal of the light emitting unit corresponding to the drive signal is detected by the photo sensing unit, and thereby detecting the presence or absence of the recording medium. Therefore, the light emission signal which had been emitted from the light emitting unit and passed through the recording medium or was reflected by the medium and which indicates the presence or absence of the recording medium is detected by the photo sensing unit, and a check is made to see if the photo sensing signal has the signal format corresponding to the drive signal of the light emitting unit or not, thereby enabling the influence by the disturbed light to be eliminated. It is possible to provide an excellent electronic apparatus in which the feeding operation of the recording medium can be controlled with the high reliability on the basis of the accurate detecting operation of the recording medium.

What is claimed is:

1. An electronic apparatus for detecting a recording medium, said apparatus comprising:

input means for inputting data in correspondence to a predetermined scan signal;

display means for displaying the data input from said input means in correspondence to a predetermined display signal;

feeding means for feeding the recording medium in a predetermined direction;

a photocoupler having a light emitting unit and a light receiving unit, for detecting the recording medium at a position near a guide path to guide the recording medium in the predetermined direction;

control means for driving the light emitting unit of said photocoupler by a pulse signal comprising repetition of a first predetermined duration of time at ON level and a second predetermined duration of time at OFF level;

comparison means for comparing a state of the light emitting unit to a state of the light receiving unit, wherein a comparison is made during the second predetermined duration to thereby eliminate any influence due to a detection of external light by the light receiving unit; and means for causing said feeding means to feed the recording medium when said comparison means indicates that the light emitting unit and the light receiving unit are on the same states during the first and second predetermined duration.

2. An electronic apparatus according to claim 1, wherein said control means drives the light emitting unit of said photocoupler by a signal which is supplied to said input means and also controls the feeding operation of the recording medium by said feeding means.

3. An electronic apparatus according to claim 1, wherein said control means drives the light emitting unit of said photocoupler by the display signal which is supplied to said display means and also controls the feeding operation of the recording medium by said feeding means.

4. An electronic apparatus for detecting a recording medium, said apparatus comprising:

input means for inputting data in correspondence to a predetermined scan signal;

display means for displaying the data input from said input means in correspondence to a predetermined display signal;

recording means for recording the data input from said input means onto the recording medium;

feeding means for feeding the recording medium in a predetermined direction;

a photocoupler having a light emitting unit and a light receiving unit, for detecting the recording medium at a position near a guide path to guide the recording medium in the predetermined direction;

control means for driving the light emitting unit of said photocoupler by a pulse signal comprising repetition of a first predetermined duration of time at ON level and a second predetermined duration of time at OFF level;

comparison means for comparing a state of the light emitting unit to a state of the light receiving unit, wherein a comparison is made during the second predetermined duration to thereby eliminate any influence due to a detection of external light by the light receiving unit; and means for causing said feeding means to feed the recording medium when said comparison means indicates that the light emitting unit and the light receiving unit are on the same states during the first and second predetermined durations.

5. An electronic apparatus according to claim 4, wherein said control means drives the light emitting unit of said photocoupler by the scan signal which is supplied to said input means and also controls the feeding operation of the recording medium by said feeding means.

6. An electronic apparatus according to claim 4, wherein said control means drives the light emitting unit of said photocoupler by the display signal which is supplied to said display means and also controls the feeding operation of the recording medium by said feeding means.

7. An electronic apparatus according to claim 5 or 6, wherein said control means controls said feeding means, thereby allowing the recording medium detected by said photocoupler to be fed to a position at which the data is recorded by said recording means.

8. An electronic apparatus for detecting a recording medium, said apparatus comprising:

feeding means for feeding the recording medium in a predetermined direction;

a photocoupler having a light emitting unit and a light receiving unit, for detecting the recording medium at a position near a guide path to guide the recording medium in the predetermined direction;

control means for driving the light emitting unit of said photocoupler by a pulse signal comprising a first predetermined duration of time at ON level an a second predetermined duration of time at OFF level;

comparison means for comparing a state of the light emitting unit to a state of the light receiving unit, wherein a comparison is made during the second predetermined duration to thereby eliminate any influence due to a detection of external light by the light receiving unit; and means for causing said feeding means to feed the recording medium when said comparison means indicates that the light emitting and the light receiving unit are on the same states during the first and second predetermined durations.

9. An electronic apparatus according to claim 8, further comprising put means for inputting data in correspondence to a predetermined scan signal.

10. An electronic apparatus according to claim 9, wherein said control means drives the light emitting unit of said photocoupler by a signal which is supplied to said input means and also controls the feeding operation of the recording medium by said feeding means.

11. An electronic apparatus according to claim 8, further comprising display means for displaying input data in correspondence to a predetermined display signal.

12. An electronic apparatus according to claim 11, wherein said control means drives the light emitting unit of said photocoupler by the display signal which is supplied to said display means and also controls the feeding operation of the recording medium by said feeding means.

13. An electronic apparatus for detecting a recording medium, said apparatus comprising:

recording means for recording data onto the recording medium;

feeding means for feeding the recording medium in a predetermined direction;

a photocoupler having a light emitting unit and a light receiving unit, for detecting the recording medium at a position near a guide path to guide the recording medium in the predetermined direction;

control means for driving the light emitting unit of said photocoupler by a pulse signal comprising a first predetermined duration of time at ON level and a second predetermined duration of time at OFF level;

comparison means for comparing a state of the light emitting unit to a state of the light receiving unit, wherein a comparison is made during the second predetermined duration to thereby eliminate any influence due to a detection of external light by the light receiving unit; and means for causing said feeding means to feed the recording medium when said comparison means indicates that the light emitting unit and the light receiving unit are on the same states during the first and second predetermined durations.

14. An electronic apparatus according to claim 13, further comprising input means for inputting data in correspondence to a predetermined scan signal.

15. An electronic apparatus according to claim 14, wherein said control means drives the light emitting unit of said photocoupler by the scan signal which is supplied to said input means and also controls the feeding operation of the recording medium by said feeding means.

16. An electronic apparatus according to claim 15, wherein said control means controls said feeding means, thereby allowing the recording medium detected by said photocoupler to be fed to a position at which the data is recorded by said recording means.

17. An electronic apparatus according to claim 14, wherein said control means controls said feeding means, thereby allowing the recording medium detected by said photocoupler to be fed to a position at which the data is recorded by said recording means.

18. An electronic apparatus according to claim 13, further comprising display means for displaying input data in correspondence to a predetermined display signal.

19. An electronic apparatus according to claim 18, wherein said control means drives the light emitting unit of said photocoupler by the display signal which is supplied to said display means and also controls the feeding operation of the recording medium by said feeding means.

20. An electronic apparatus according to claim 19, wherein said control means controls said feeding means, thereby allowing the recording medium detected by said photocoupler to be fed to a position at which the data is recorded by said recording means.

21. An electronic apparatus according to claim 18, wherein said control means controls said feeding means, thereby allowing the recording medium detected by said photocoupler to be fed to a position at which the data is recorded by said recording means.

22. An electronic apparatus according to claim 13, wherein said control means controls said feeding means, thereby allowing the recording medium detected by said photocoupler to be fed to a position at which the data is recorded by said recording means.

* * * * *

UNITED STATES PATENT AND TRADEMARK OFFICE
CERTIFICATE OF CORRECTION

PATENT NO. : 5,237,644 Page 1 of 3

DATED : August 17, 1993

INVENTOR(S) : Hayato SHINOHARA

It is certified that error appears in the above-identified patent and that said Letters Patent is hereby corrected as shown below:

COLUMN 1:

Line 31, "malfunction" should be deleted;

Line 32, "prevent" should read --prevent malfunction of--;

Line 36, "a kind of" should be deleted;

Line 42, "is is" should read --is--.

COLUMN 2:

Line 32, "it was" should be deleted; "through" should be deleted;

Line 57, "taken out" should read --produced--.

COLUMN 3:

Line 9, "are" should read --is--;

Line 13, "lights" should read --light.--;

Line 21, "lights" should read --light--;

Line 29, "had" should read --has--;

Line 30, "was" should read --is--;

Line 36, "and" should be deleted;

Line 37, "lights" should read --light--;

UNITED STATES PATENT AND TRADEMARK OFFICE
CERTIFICATE OF CORRECTION

Figure 6:
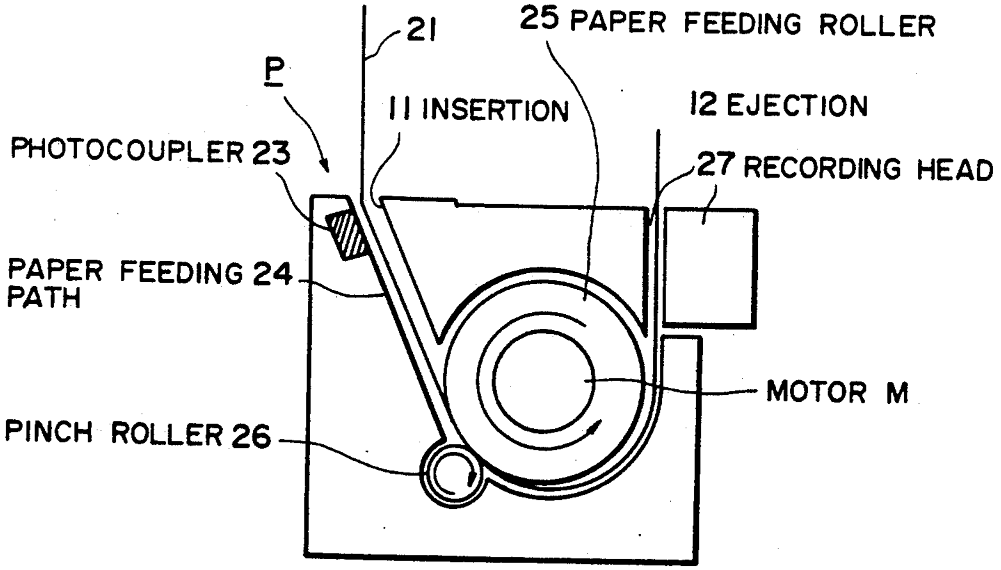

PATENT NO. : 5,237,644 Page 2 of 3
DATED : August 17, 1993
INVENTOR(S) : Hayato SHINOHARA It is certified that error appears in the above-identified patent and that said Letters Patent is hereby corrected as shown below:

Line 50, "of" should read --of a--;

Line 53, "invention, respectively;" should read --invention;--;

Line 61, "cross sectional" should read --cross-sectional--;

Line 63, "FIG. 6, respectively;" should read --FIG. 6;--;

Line 66, "cross sectional" should read --cross-sectional--.

COLUMN 4:

Line 13, "printer" should read --the printer--.

UNITED STATES PATENT AND TRADEMARK OFFICE

CERTIFICATE OF CORRECTION

PATENT NO. : 5,237,644 Page 3 of 3

DATED : August 17, 1993

INVENTOR(S) : Hayato SHINOHARA

It is certified that error appears in the above-identified patent and that said Letters Patent is hereby corrected as shown below:

COLUMN 5:

Line 19, "medium the" should be deleted.

COLUMN 7:

Line 20, "duration." should read --durations.--.

COLUMN 8:

Line 22, "an" should read --and--;
Line 37, "put" should read --input--.

Signed and Sealed this

Fifth Day of July, 1994

Attest:

BRUCE LEHMAN

Attesting Officer

Commissioner of Patents and Trademarks